(12) United States Patent
Honda

(10) Patent No.: US 11,855,486 B2
(45) Date of Patent: Dec. 26, 2023

(54) STATOR CORE, ROTOR CORE, AND MOTOR

(71) Applicant: Nidec Corporation, Kyoto (JP)

(72) Inventor: Takeshi Honda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 184 days.

(21) Appl. No.: 17/429,682

(22) PCT Filed: Feb. 3, 2020

(86) PCT No.: PCT/JP2020/003906
§ 371 (c)(1),
(2) Date: Aug. 10, 2021

(87) PCT Pub. No.: WO2020/170782
PCT Pub. Date: Aug. 27, 2020

(65) Prior Publication Data
US 2022/0158508 A1    May 19, 2022

(30) Foreign Application Priority Data

Feb. 20, 2019    (JP) .................... 2019-028724

(51) Int. Cl.
*H02K 1/16* (2006.01)
*H02K 3/34* (2006.01)

(52) U.S. Cl.
CPC .................... *H02K 1/165* (2013.01)

(58) Field of Classification Search
CPC .................... H02K 1/165; H02K 3/34
USPC ..... 310/216.061, 216.068, 216.057, 216.069
See application file for complete search history.

(56) References Cited

U.S. PATENT DOCUMENTS 9,653,960 B2    5/2017    Matsuda et al.

FOREIGN PATENT DOCUMENTS

| CN | 204597753 U | 8/2015 |
| CN | 205622411 U | 10/2016 |
| CN | 105006938 B | 6/2018 |
| EP | 2 937 975 A2 | 10/2015 |
| JP | 0684552 | * 12/1994 |
| JP | 1169669 A | * 3/1999 |
| JP | 2003-319587 A | 11/2003 |
| JP | 2010-035328 A | 2/2010 |
| JP | 2015-211558 A | 11/2015 |
| JP | 2016-129473 A | 7/2016 |
| KR | 20110008749 A | * 1/2011 |

OTHER PUBLICATIONS

Official Communication issued in International Patent Application No. PCT/JP2020/003906, dated Apr. 7, 2020.

* cited by examiner

*Primary Examiner* — Jose A Gonzalez Quinones
(74) *Attorney, Agent, or Firm* — Keating & Bennett, LLP

(57) ABSTRACT

A stator core includes a core back having an annular shape around a central axis, teeth extending outward from the core back in a radial direction, and an inner peripheral surface located inside the core back in the radial direction and extending from an upper end to a lower end of the core back around the central axis. The core back includes a plastically deformable portion having an annular shape around the central axis and disposed below the core back in the axial direction. At least a portion of the plastically deformable portion has a different distance from the central axis than another portion of the core back.

8 Claims, 2 Drawing Sheets

STATOR CORE, ROTOR CORE, AND MOTOR

CROSS-REFERENCE TO RELATED APPLICATIONS

This is a U.S. national stage of application No. PCT/JP2020/003906, filed on Feb. 3, 2020, and with priority under 35 U.S.C. § 119(a) and 35 U.S.C. § 365(b) being claimed from Japanese Patent Application No. 2019-028724, filed on Feb. 20, 2019; the entire disclosures of which are hereby incorporated herein by reference.

FIELD OF THE INVENTION

The present disclosure relates to a stator core, a rotor core, and a motor.

BACKGROUND

For example, there is a conventional motor. As in the conventional motor, stacked steel sheets of a stator core and a rotor core are joined to each other by crimping or welding.

In the motor having such a configuration, crimping may not be performed at a tooth part for suppressing deformation of the tooth part. In this case, crimping is performed at a core back part, but when the core back part is plastically deformed by crimping or the like, the entire stator core may be distorted, which may adversely affect motor characteristics, dimensional accuracy, and the like.

SUMMARY

An example embodiment of a stator core according to the present disclosure includes a core back having an annular shape around a central axis, teeth extending outward from the core back in a radial direction, and an inner peripheral surface located inside the core back in the radial direction and extending from an upper end to a lower end of the core back around the central axis. The core back includes a plastically deformable portion that has an annular shape around the central axis and that is below the core back in an axial direction. At least a portion of the plastically deformable portion has a different distance from the central axis than another portion of the core back.

The above and other elements, features, steps, characteristics and advantages of the present disclosure will become more apparent from the following detailed description of the example embodiments with reference to the attached drawings.

DETAILED DESCRIPTION

Example embodiments of the present application will be described below with reference to the accompanying drawings. In the present application, a direction parallel to a central axis of a stator core is referred to as an "axial direction", a direction perpendicular to a central axis of a stator core is referred to as a "radial direction", and a direction along an arc about the central axis of the stator core is referred to as a "circumferential direction".

In addition, a "parallel direction" in the present application includes a substantially parallel direction. Furthermore, an "orthogonal direction" in the present application includes a substantially orthogonal direction.

Figure 1:
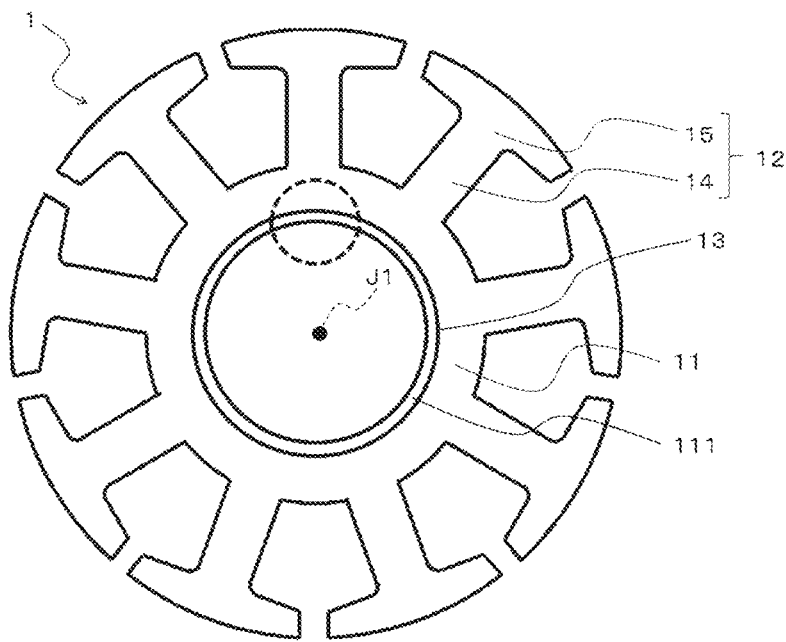
FIG. 1 is a plan view of a stator core according to an example embodiment of the present disclosure.

FIG. 1 is a plan view illustrating a stator core 1. A core back 11 is an annular part around a central axis J1. The core back 11 has an inner peripheral surface 13 on an inner periphery in the radial direction. A plurality of teeth 12 radially extends outward in the radial direction from the core back 11. The plurality of teeth 12 is arranged at substantially regular intervals in the circumferential direction. Each of the teeth 12 includes a tooth body part 14 and a tooth tip part 15. The tooth body part 14 extends substantially linearly outward in the radial direction from the core back 11. The tooth tip part 15 extends to each side in the circumferential direction from an outer end of the tooth body part 14 in the radial direction. The core back 11 and the plurality of teeth 12 are, for example, a continuous metal member.

In addition, a plastically deformable portion 111 is provided to the core back 11 for joining stacked steel sheets. The plastically deformable portion 111 is located below an upper end surface of the core back 11 in the axial direction in the core back 11. The plastically deformable portion 111 has an annular shape around the central axis J1 and is an area including a portion of the inner peripheral surface of the core back.

Figure 2:
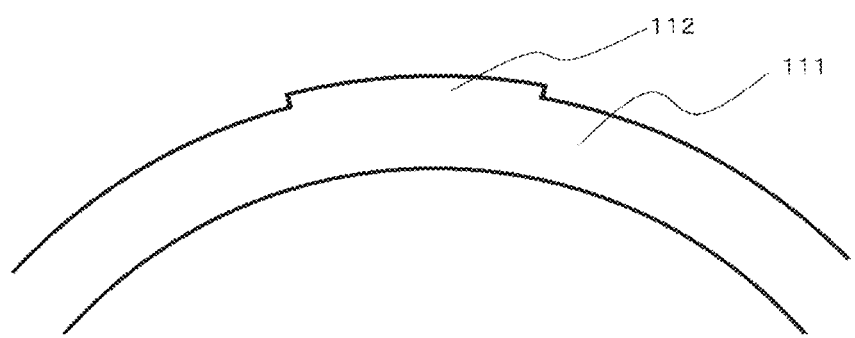
FIG. 2 is a partially enlarged view of the stator core according to an example embodiment of the present disclosure.

As illustrated in FIG. 2, at least a portion of the plastically deformable portion 111 has a deformable portion 112 which is an area having a different distance from the central axis J1. More specifically, the distance from the central axis J1 to the deformable portion 112 that is at least a portion of the outer periphery of the annular plastically deformable portion 111 is different from the distance from the central axis J1 to the plastically deformable portion 111. Note that the area having a different distance from the central axis J1 is not limited to be formed in one location of the plastically deformable portion 111. Such area may be formed in two or more locations.

In the present example embodiment, the plastically deformable portion 111 has a toric or annular shape. In the plastically deformable portion 111 having a toric or annular shape, the deformable portion 112, which is the area having a different distance from the central axis J1, is an arc having a diameter different from that of the plastically deformable portion 111. In FIG. 2, a connecting portion between the deformable portion 112 and the plastically deformable portion 111 has a linear shape extending in the radial direction. However, it may have an arc shape.

Figure 3:
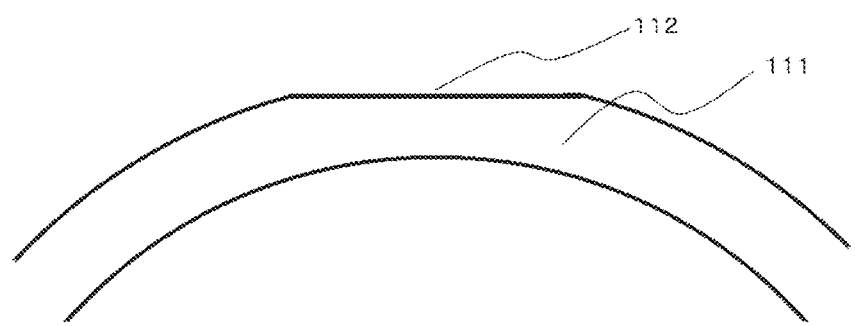
FIG. 3 is a partially enlarged view of a stator core according to a modification of an example embodiment of the present disclosure.
Figure 4:
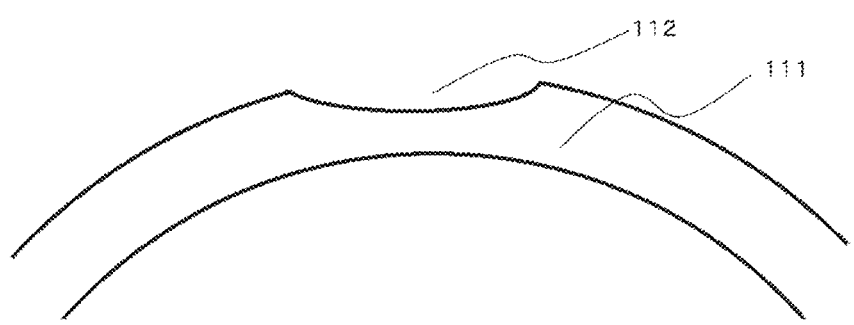
FIG. 4 is a partially enlarged view of a stator core according to a modification of an example embodiment of the present disclosure.

Note that the deformable portion 112 is not necessarily arcuate. For example, it may have a linear shape as shown in FIG. 3, or may have an arc protruding inward in the radial direction as shown in FIG. 4. Further, it may have a rectangular shape. In addition, the deformable portion 112 is not limited to be provided in one location. A plurality of deformable portions may be provided, and the plastically deformable portion 111 may be polygonal.

The stator core 1 is manufactured by stacking steel sheets manufactured by press working. The plastically deformable portion 111 may be formed every time the steel sheet is stacked in the manufacturing process, or may be formed after all the steel sheets constituting the stator core 1 are stacked.

Figure 5:
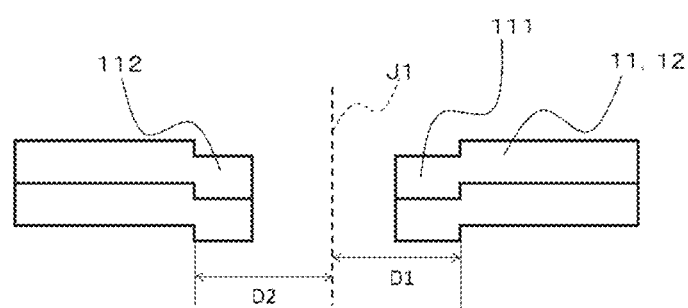
FIG. 5 is a cross-sectional view of the stator core according to an example embodiment of the present disclosure.

As illustrated in FIG. 5, when the steel sheets of the stator core 1 are stacked one by one, they are stacked with the deformable portions 112 overlapping each other in the axial direction, so that the deformable portions 112 function as a detent. In order to suppress the eccentricity of the center of gravity or to stack the steel sheets askew, the steel sheets may be stacked while being rotated at predetermined angle intervals. In this case, although depending on the angle of rotation, the steel sheets are stacked with at least a portion of the deformable portion 112 overlapping with the other portion of the plastically deformable portion 111. In this case, since the deformable portion 112 is press-fitted into the plastically deformable portion 111 as compared with a case where the steel sheets are simply stacked with the deformable portions 112 overlapping each other, the fixing strength between them is enhanced. In addition, the deformable portion 112 is different in shape from the other portion of the plastically deformable portion 111. Therefore, when the steel sheets constituting the stator core 1 are stacked while being rotated at predetermined angle intervals, they are fixed to each other.

In the present example embodiment, a distance D2 from the central axis J1 to the outer periphery of the deformable portion 112 is larger than a distance D1 from the central axis J1 to the outer periphery of the plastically deformable portion 111. Note that the distance D2 from the central axis J1 to the outer periphery of the deformable portion 112 may be smaller than the distance D1 from the central axis J1 to the outer periphery of the plastically deformable portion 111. In addition, the deformable portion 112 may have both an area where the distance D2 from the central axis J1 to the outer periphery of the deformable portion 112 is greater than the distance D1 from the central axis J1 to the outer periphery of the plastically deformable portion 111 and an area where the distance D2 is smaller than the distance D1.

As described above, the annular plastically deformable portion 111 is provided to the core back 11 for joining stacked steel sheets. Thus, the stacked steel sheets can be joined to each other, and distortion due to plastic deformation of the stator core can be suppressed. In addition, since a portion of the plastically deformable portion 111 has a different distance from the central axis J1, it is possible to suppress displacement of the stator core. Since at least a portion of the plastically deformable portion 111 has a different distance from the central axis J1, it functions as a detent. Therefore, a motor having excellent motor characteristics and dimensional accuracy can be obtained.

The plastically deformable portion 111 has an annular shape around the central axis J1. In the present example embodiment, the plastically deformable portion 111 has a toric or annular shape. As a result, stress due to plastic deformation is uniformly applied, so that distortion is further suppressed.

At least a portion of the plastically deformable portion 111 having a toric or annular shape is an arc having a diameter different from that of the plastically deformable portion 111. With this configuration, it is possible to suppress distortion while enhancing dimensional accuracy of the stator core 1.

The stator core 1 may be a skew core. In this case, displacement of skew is also suppressed, because at least a portion of the plastically deformable portion 111 has a different distance from the central axis J1. Thus, a motor having excellent motor characteristics and dimensional accuracy can be obtained.

Note that a shaft member such as a shaft or a bracket (not illustrated) may be fixed to the stator core 1. The shaft member is in contact with the inner peripheral surface of the core back 11 and is fixed by various methods such as adhesion, welding, and press fitting.

Note that the stator core 1 may be used as a component constituting a motor. More specifically, the motor includes the stator core 1, a rotor centered on the central axis J1 and disposed outside the stator core, and a magnet fixed to the rotor and facing the stator core 1.

In addition, shapes and the like of details of the stator core and the motor may be different from those illustrated in the drawings of the present application. In addition, the components presented in the example embodiment and the modification described above may be combined together, as appropriate, as long as there is no inconsistency.

The present application can be used for a stator core and a motor.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A stator core comprising:
a core back having an annular shape around a central axis;
teeth extending outward from the core back in a radial direction; and
an inner peripheral surface located inside the core back in the radial direction and extending from an upper end to a lower end of the core back around the central axis; wherein
the core back includes a plastically deformable portion defined in the core back;
the plastically deformable portion has an annular shape around the central axis;
the plastically deformable portion is below other portions of the core back in an axial direction; and
at least a portion of the plastically deformable portion has a different distance from the central axis than another portion of the core back.

2. The stator core according to claim 1, wherein the plastically deformable portion differs in distance from the central axis to an outer periphery in the radial direction than the another portion of the core back.

3. The stator core according to claim 1, wherein an inner peripheral surface of the plastically deformable portion defines a portion of the core back.

4. The stator core according to claim 1, wherein the plastically deformable portion has a toric or annular shape.

5. The stator core according to claim 4, wherein at least a portion of the plastically deformable portion is an arc having a different diameter from another portion of the plastically deformable portion.

6. The stator core according to claim 1, further comprising steel sheets that are stacked askew.

7. The stator core according to claim 1, further comprising a columnar shaft fixed to the stator core and centered on the central axis; wherein the shaft includes an outer peripheral surface that is in contact with the inner peripheral surface.

8. A motor comprising:

the stator core according to claim 1; and a rotor outside the stator core.

* * * * *